(12) United States Patent
Miyazawa et al.

(10) Patent No.: US 10,216,342 B2
(45) Date of Patent: Feb. 26, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Yusuke Miyazawa, Tokyo (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/206,867

(22) Filed: Jul. 11, 2016

(65) Prior Publication Data
US 2016/0320880 A1 Nov. 3, 2016

Related U.S. Application Data

(63) Continuation of application No. 13/391,782, filed as application No. PCT/JP2010/058405 on May 19, 2010.

(30) Foreign Application Priority Data

Aug. 31, 2009 (JP) ................. 2009-200870

(51) Int. Cl.
G06F 3/044 (2006.01)
G01C 21/36 (2006.01)
(Continued)

(52) U.S. Cl.
CPC ......... *G06F 3/044* (2013.01); *G01C 21/3664* (2013.01); *G06F 3/0416* (2013.01);
(Continued)

(58) Field of Classification Search
CPC ... G01C 21/3664; G06F 3/0416; G06F 3/044; G06F 3/04817; G06F 3/0482;
(Continued)

(56) References Cited

U.S. PATENT DOCUMENTS 5,602,566 A 2/1997 Motosyuku et al.
8,781,734 B2 * 7/2014 Yamazaki .......... G01C 21/3673
340/995.1

(Continued)

FOREIGN PATENT DOCUMENTS

JP 10040055 A 2/1998
JP 2004-192241 7/2004
(Continued)

OTHER PUBLICATIONS

Apr. 5, 2018, European Summons issued for related EP application No. 10811574.2.
(Continued)

*Primary Examiner* — Stacy Khoo
(74) *Attorney, Agent, or Firm* — Paratus Law Group. PLLC

(57) ABSTRACT

An information processing apparatus includes a detection unit for detecting a contact operation and a pressure of an operating object on a contact operation surface, a display switching unit for switching display on a display screen according to the pressure of the operating object detected by the detection unit, and an execution unit for performing a predetermined process, in a case a predetermined operation of the operating object on the contact operation surface is detected by the detection unit while the display on the display screen is being switched by the display switching unit, according to the predetermined operation.

17 Claims, 13 Drawing Sheets

(51) Int. Cl.
*G06F 3/041* (2006.01)
*G06F 3/0488* (2013.01)
*G06F 3/0481* (2013.01)
*G06F 3/0482* (2013.01)
*G06F 3/0484* (2013.01)

(52) U.S. Cl.
CPC .......... *G06F 3/0482* (2013.01); *G06F 3/0488* (2013.01); *G06F 3/04817* (2013.01); *G06F 3/04845* (2013.01); *G06F 3/04883* (2013.01); *G06F 2203/04105* (2013.01)

(58) Field of Classification Search
CPC ............... G06F 3/04845; G06F 3/0488; G06F 3/04883; G06F 2203/04105
USPC ...................... 345/173–179; 178/18.01–18.09
See application file for complete search history.

(56) References Cited

U.S. PATENT DOCUMENTS

| | | | |
|---|---|---|---|
| 2004/0008191 A1 | 1/2004 | Poupyrev et al. | |
| 2004/0150668 A1 | 8/2004 | Myers et al. | |
| 2005/0081164 A1* | 4/2005 | Hama | G06F 3/0482 715/830 |
| 2005/0248545 A1* | 11/2005 | Nishimura | G06F 1/1626 345/173 |
| 2006/0017692 A1 | 1/2006 | Wehrenberg et al. | |
| 2006/0125799 A1 | 6/2006 | Hillis et al. | |
| 2006/0132457 A1 | 6/2006 | Rimas-Ribikauskas et al. | |
| 2006/0284858 A1 | 12/2006 | Rekimoto | |
| 2007/0180409 A1* | 8/2007 | Sohn | G06F 1/1694 715/863 |
| 2007/0214434 A1* | 9/2007 | Rydenhag | G06F 17/3056 715/854 |
| 2007/0273669 A1* | 11/2007 | Park | G06F 3/04883 345/173 |
| 2008/0016450 A1 | 1/2008 | Aono | |
| 2008/0024454 A1 | 1/2008 | Everest | |
| 2008/0055272 A1* | 3/2008 | Anzures | G06F 1/1626 345/173 |
| 2008/0122794 A1* | 5/2008 | Koiso | G06F 3/0482 345/173 |
| 2009/0135150 A1* | 5/2009 | Takashima | G06F 3/041 345/173 |
| 2009/0300530 A1 | 12/2009 | Falchuk | |
| 2010/0026640 A1* | 2/2010 | Kim | G06F 3/0414 345/173 |
| 2010/0044121 A1 | 2/2010 | Simon et al. | |
| 2010/0125816 A1 | 5/2010 | Bezos | |
| 2010/0194688 A1* | 8/2010 | Shim | G06F 1/169 345/163 |
| 2010/0271312 A1 | 10/2010 | Alameh et al. | |

FOREIGN PATENT DOCUMENTS

| | | |
|---|---|---|
| JP | 2008-192092 | 8/2008 |
| WO | WO2008/016387 A1 | 2/2008 |

OTHER PUBLICATIONS

Nov. 7, 2018, European Communication issued for related EP application No. 10811574.2.

* cited by examiner

FIG. 11
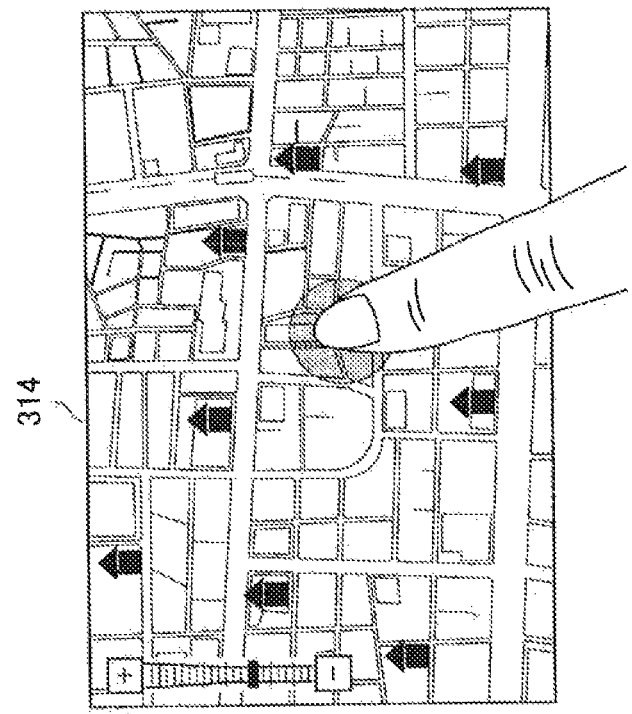
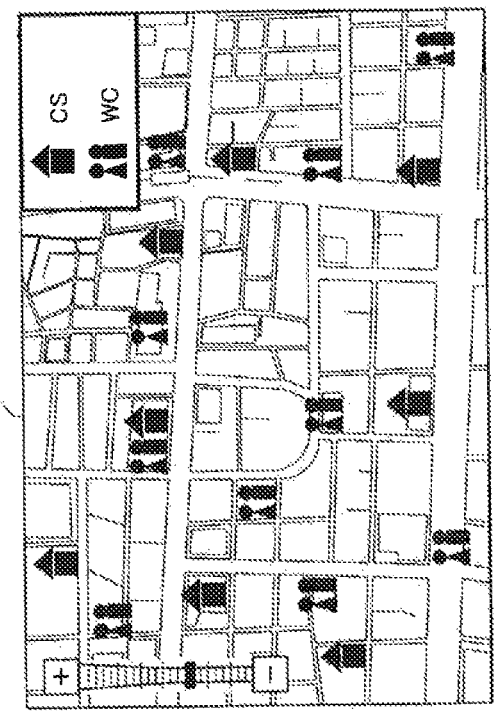

INFORMATION PROCESSING APPARATUS, INFORMATION PROCESSING METHOD, AND PROGRAM

CROSS-REFERENCE TO PRIOR APPLICATION

This application is a continuation of U.S. patent application Ser. No. 13/391,782 (filed on Feb. 22, 2012), which is a National Stage Application of PCT International Patent Application No. PCT/JP2010/058405 (filed on May 19, 2010) under U.S.C. § 371, which claims priority to Japanese Patent Application No. 2009-200870 (filed on Aug. 31, 2009), which are all hereby incorporated by reference in their entirety.

TECHNICAL FIELD

The present invention relates to an information processing apparatus, an information processing method, and a program.

BACKGROUND ART

As a display device, there is a touch screen (touch panel) provided with a touch sensor of a capacitive type or a resistive type on the surface of a display unit such as a liquid crystal display. According to the touch screen, by touching the display screen, input to an information processing apparatus is made possible, and a user can easily handle the information processing apparatus.

These days, technologies for increasing user-friendliness with respect to input using a touch screen are being disclosed (for example, Patent Literature 1). In Patent Literature 1, a pressure of an operating object contacting a touch screen is detected, and the detected pressure data and a process related to an operation such as cursor movement, double-click or the like are associated. This enables to increase processes related to operations in an information processing apparatus provided with a touch screen.

CITATION LIST

Patent Literature

Patent Literature 1: JP2008-192092A

SUMMARY OF INVENTION

Technical Problem

Now, these days, with the increase in the performance of a portable information terminal, data having a large number of hierarchical levels is processed more and more often. For example, music data of a portable information terminal includes four hierarchical levels, i.e. artist, album, music piece, and playback screen. In the case of playing back music data having a hierarchical structure with an information processing apparatus provided with a touch screen, a desired piece of music is selected by touching targets on a display screen in the order of artist, album, music piece, and playback screen. In the case of reselecting the piece of music to be played back, it was necessary to reselect a target in a hierarchical level by touching "return" or the like on the display screen several times and tracing back the hierarchical levels in the order.

Also, in the case of displaying on a map a spot having a multi-level hierarchy, such as a building, it was necessary to switch from map display to floor display at each spot and display the contents. In the above case, there was a problem that, since the hierarchical levels had to be traced back by touching several times to reselect a target or the display screen had to be switched, the operation steps increased and the operability was reduced.

Accordingly, the present invention is made in view of the above problem, and the object of the present invention is to provide an information processing apparatus, an information processing method, and a program which are novel and improved, and which are capable of performing switching of a display screen and selection of a target according to pressures from an operating object and reducing operation steps.

Solution to Problem

According to an aspect of the present invention, in order to achieve the above-mentioned object, there is provided an information processing apparatus including a detection unit for detecting a contact operation and a pressure of an operating object on a contact operation surface, a display switching unit for switching display on a display screen according to the pressure of the operating object detected by the detection unit, and an execution unit for performing a predetermined process, in a case a predetermined operation of the operating object on the contact operation surface is detected by the detection unit while the display on the display screen is being switched by the display switching unit, according to the predetermined operation.

The display switching unit may switch, according to the pressure of the operating object detected by the detection unit, display on the display screen corresponding to each of hierarchical levels allowing processing of a multi-level hierarchy to be performed, and in a case another operation of the operating object is detected by the detection unit while the display screen is being switched to display of one hierarchical level among the multi-level hierarchy by the display switching unit, the execution unit may perform a process at the one hierarchical level according to the other operation.

The display switching unit may switch, in a case the pressure of the operating object detected by the detection unit increased, display to a display screen of a hierarchical level lower than the one hierarchical level displayed on the display screen, and switch, in a case the pressure of the operating object detected by the detection unit decreased, display to a display screen of a hierarchical level higher than the one hierarchical level displayed on the display screen.

The display switching unit may cause a map display including hierarchical display indicating one or more multi-level hierarchy to be displayed on the display screen, and cause, according to the contact operation of the operating object detected by the detection unit, the map display including contents of the hierarchical display to be displayed on the display screen.

The display switching unit may switch display contents of the hierarchical display included in the map display displayed on the display screen, according to the pressure of the operating object detected by the detection unit.

The display switching unit may switch display while increasing transparency of display on the display screen before switching, according to the pressure of the operating object detected by the detection unit.

The display switching unit may switch display while reducing a display size of the display screen before switching of the display screen, according to the pressure of the operating object detected by the detection unit.

The execution unit may perform a predetermined process, in a case a contact operation of another operating object different from the operating object which has pressed the contact surface is detected by the detection unit while display on the display screen is being switched by the display switching unit, according to the contact operation of the other operating object.

The execution unit may perform a predetermined process, in a case the pressure of the operating object detected by the detection unit exceeds a predetermined threshold within a predetermined time while display on the display screen is being switched by the display switching unit, according to the contact operation of the operating object.

The detection unit may detect turning of a housing, and the execution unit may perform a predetermined process according to the turning of the housing in a case the turning of the housing is detected by the detection unit while display on the display screen is being switched by the display switching unit.

The display switching unit may change a display colour of a position corresponding to a contact part on the contact operation surface according to the pressure of the operating object on the contact operation surface detected by the detection unit.

According to another aspect of the present invention, in order to achieve the above-mentioned object, there is provided an information processing method including the steps of detecting a contact operation and a pressure of an operating object on a contact operation surface, switching display on a display screen according to the pressure of the operating object which has been detected, and performing a predetermined process, in a case a predetermined operation of the operating object on the contact operation surface is detected while the display on the display screen is being switched, according to the predetermined operation.

According to another aspect of the present invention, in order to achieve the above-mentioned object, there is provided a program for causing a computer to function as an information processing apparatus including a detection unit for detecting a contact operation and a pressure of an operating object on a contact operation surface, a display switching unit for switching display on a display screen according to the pressure of the operating object detected by the detection unit, and an execution unit for performing a predetermined process, in a case a predetermined operation of the operating object on the contact operation surface is detected by the detection unit while the display on the display screen is being switched by the display switching unit, according to the predetermined operation.

Advantageous Effects of Invention

As described above, according to the present invention, it is possible to perform switching of a display screen and selection of a target according to pressures from an operating object and to reduce operation steps.

BRIEF DESCRIPTION OF DRAWINGS

FIG. 11 describes a case where a plurality of spots are displayed on a map according to the embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Furthermore, the "Description of Embodiments" will be described according to the following order.
(1) Object of Present Embodiment
(2) Hardware Configuration of Information Processing Apparatus
(3) Functional Configuration of Information Processing Apparatus
(4) Details of Operation of Information Processing Apparatus (1) Object of Present Embodiment First, an object of an embodiment of the present invention will be described. As a display device, there is a touch screen (touch panel) provided with a touch sensor of a capacitive type or a resistive type on the surface of a display unit such as a liquid crystal display. According to the touch screen, by touching the display screen, input to an information processing apparatus is made possible, and a user can easily handle the information processing apparatus.

These days, a technology for increasing user-friendliness with respect to input using a touch screen is disclosed. According to this technology, a pressure of an operating object contacting a touch screen is detected, and the detected pressure data and a process related to an operation such as cursor movement, double-click or the like are associated. This enables to increase processes related to operations in an information processing apparatus provided with a touch screen.

Figure 13:
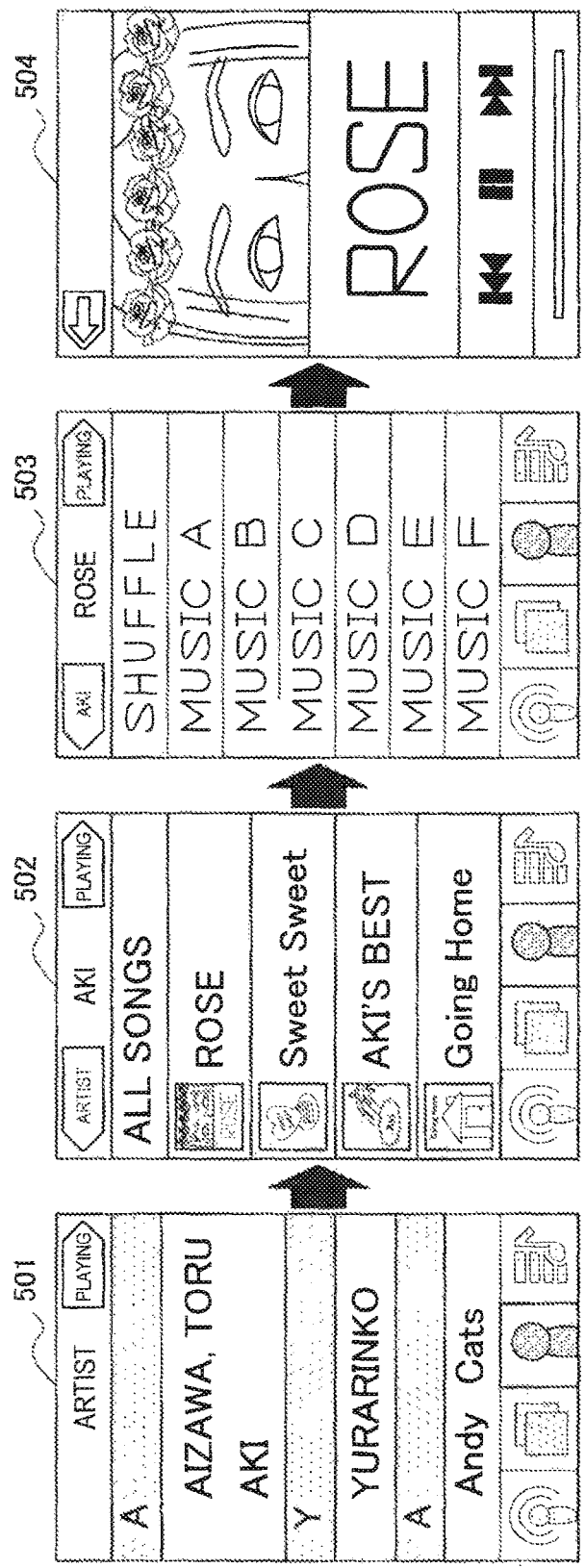
FIG. 13 is an explanatory diagram describing a conventional display switching process.

Now, these days, with the increase in the performance of a portable information terminal, data having a large number of hierarchical levels is processed more and more often. For example, as shown in FIG. 13, music data of a portable information terminal includes four hierarchical levels, i.e. an artist selection screen 501, an album selection screen 502, a music selection screen 503, and a playback screen 504. In the case of playing back music data having a hierarchical structure with an information processing apparatus provided with a touch screen, a desired piece of music is selected by touching targets on display screens in the order of the artist selection screen 501, the album selection screen 502, and the music selection screen 503.

In the case of reselecting the piece of music to be played back, it was necessary to reselect a target in a hierarchical level by touching a display such as "return" to a higher level on the display screen several times and tracing back the hierarchical levels in the order. For example, in the case change of artist is desired in a state where the playback screen 504 is displayed, one returns from the playback screen 504 to the music selection screen 503, the album selection screen 502, and further to the artist selection screen 501. Then, a target artist can be changed on the artist selection screen 501.

Also, in the case of displaying on a map a spot having a multi-level hierarchy, it was necessary to switch from map display to floor display at each spot and display the contents. For example, as shown in FIG. 14, in the case a plurality of spots were made browsing targets, it was difficult to browse the contents of floors of the plurality of spots displayed on the map without screen transition.

Figure 14:
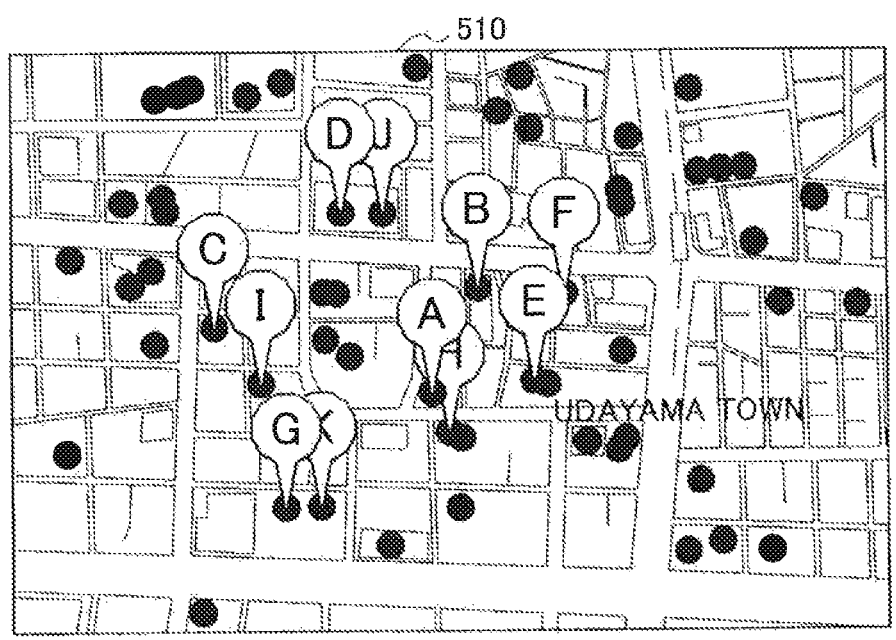
FIG. 14 is an explanatory diagram describing a conventional display switching process.

Also, as shown in FIG. 14, in the case a plurality of spots were made browsing targets, displays showing the plurality of spots overlapped each other and it was not possible to browse all the targets. As described, with a conventional information processing apparatus, there was a problem that, since the hierarchical levels had to be traced back by performing touching several times to reselect a target or the display screen had to be switched, the operation steps increased and the operability was reduced.

Accordingly, an information processing apparatus 100 according to an embodiment of the present invention has been created in view of the above-described circumstance. According to the information processing apparatus 100 according to the present embodiment, it is possible to perform switching of a display screen and selection of a target according to pressures from an operating object and to reduce operation steps.

Figure 1:
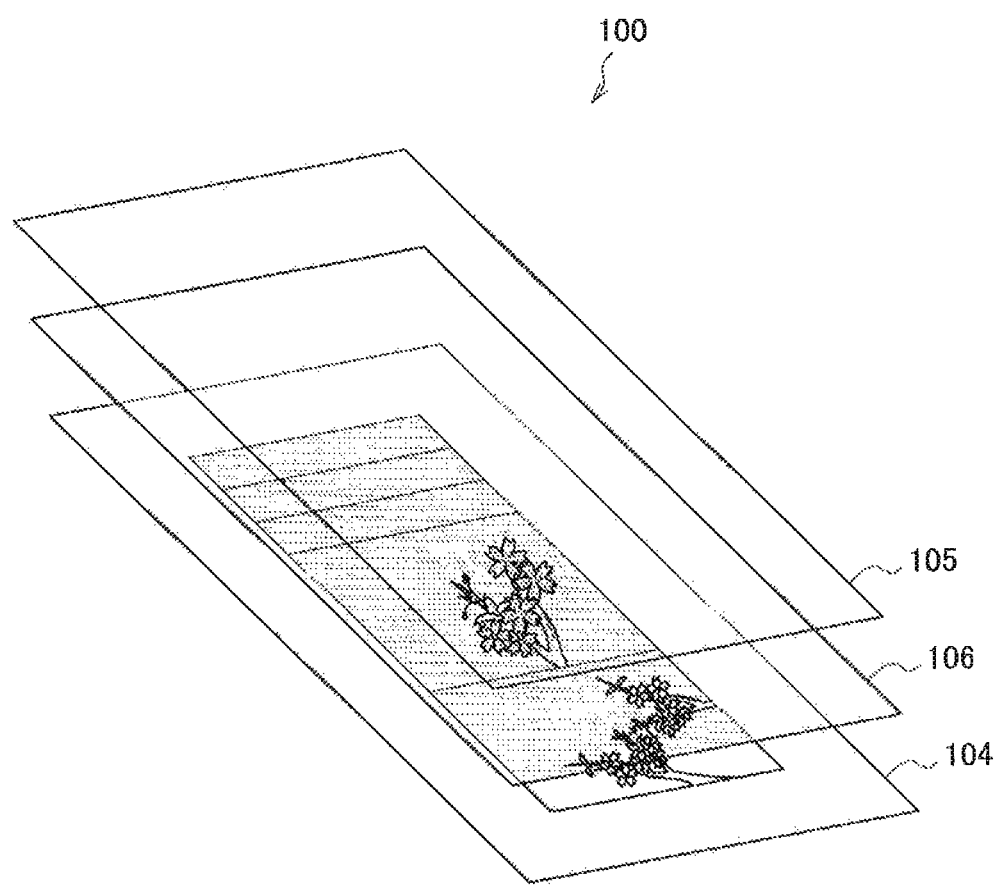
FIG. 1 is an explanatory diagram showing a configuration of a display device of an information processing apparatus according to an embodiment of the present invention.

In the present embodiment, an explanation will be given taking a small audio player or media player, a PDA (personal digital assistant), a mobile phone, or the like as shown in FIG. 1 as an example of the information processing apparatus 100, but limitation is not made to such examples, and application to a personal computer or the like is also possible. Also, it is configured as one device with a display device such as a display, but limitation is not made to such an example, and the information processing apparatus 100 and the display device may be configured to be separate devices.

(2) Hardware Configuration of Information Processing Apparatus

In the foregoing, an object of the embodiment of the present invention has been described. Next, the configuration of a display device of the information processing apparatus 100 according to the present embodiment will be described with reference to FIG. 1. FIG. 1 is an explanatory diagram showing the configuration of a display device of the information processing apparatus 100 according to the present embodiment. The information processing apparatus 100 according to the present embodiment is a device allowing input of information by contact or press-down by an operating object on a display screen of the display device for displaying information. A user possessing the information processing apparatus 100 causes an operating object to contact a target shown as an icon, a letter key or the like displayed on the display device, and can thereby select or determine the target contacted by the operating object.

An input display unit of such information processing apparatus 100 is configured, as shown in FIG. 1, by stacking a sheet-type pressure-sensitive sensor 106 and a capacitive touch panel 105 on the side of the display screen of a display device 104.

The capacitive touch panel 105 has a function of detecting contact of an operating object on the display screen. The capacitive touch panel 105 is provided with capacitive sensors arranged in a lattice, and constantly changes the values depending on the change in the capacitance. In the case a finger which is an operating object nears or touches a capacitive sensor, the capacitance detected by the capacitive sensor increases. The capacitance of each capacitive sensor can be simultaneously acquired. The shape of the finger that is in proximity or in contact can be detected by simultaneously detecting changes in the capacitance of all the capacitive sensors and performing interpolation. The capacitive touch panel 105 outputs the value of the detected capacitance to a CPU (Central Processing Unit; reference sign 101 in FIG. 2).

Furthermore, the pressure-sensitive sensor 106 has a function of detecting pressure pressing the display screen. The pressure-sensitive sensor 106 can use a sensor of a resistive pressure-sensitive type that forms electrode surfaces by two sheet panels, for example, and detects conduction at a pressed part to thereby detect the position. Similarly to the capacitive touch panel 105, the pressure-sensitive sensor 106 also has a plurality of detection points for detecting a pressed position within the sheets. Conduction at each detection point can be simultaneously detected. The pressure-sensitive sensor 106 outputs to the CPU pressure pressing the display screen detected at each detection point.

The CPU associates various information input from the capacitive touch panel 105 and the pressure-sensitive sensor 106 with display positions of display contents displayed on the display device 104, and analyses the movement of the operating object. Then, the CPU recognises, based on the analysed movement of the operating object, input information input to the information processing apparatus 100, and performs a process corresponding to the input information. In this manner, a user can operate contents displayed on the display screen and input information. Additionally, when the operating object is made to contact or press the display screen of the display device 104, the operating object is actually not contacting the display screen of the display device 104 but is contacting the surface of the capacitive touch panel 105. Also in the case the operating object is actually contacting the surface of the capacitive touch panel 105 in this manner, an explanation may be given in the following as "causing the operating object to contact the display screen of the display device 104."

Figure 2:
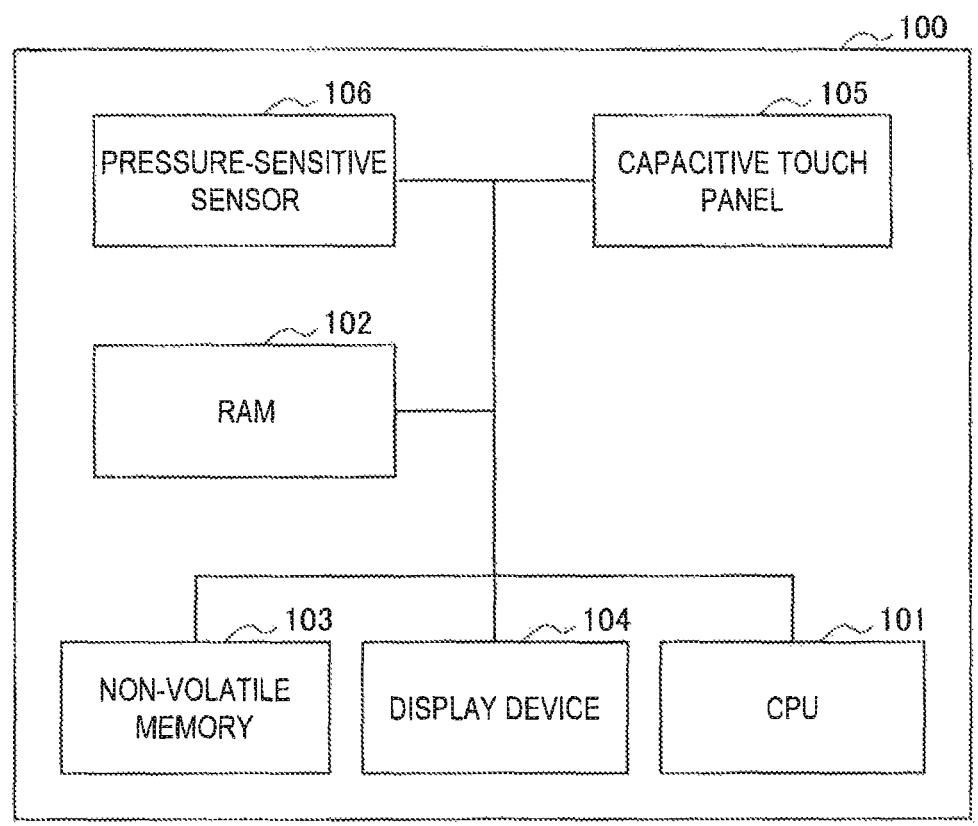
FIG. 2 is an explanatory diagram describing a hardware configuration of the information processing apparatus according to the embodiment.

Next, the hardware configuration of the information processing apparatus 100 will be described based on FIG. 2. As shown in FIG. 2, the information processing apparatus 100 according to the present embodiment includes the CPU 101, a RAM (Random Access Memory) 102, a non-volatile memory 103, the display device 104, the capacitive touch panel 105, and the pressure-sensitive sensor 106.

As described above, the CPU 101 functions as an arithmetic processing unit and a control unit, and controls entire operation within the information processing apparatus 100 according to various programs. Also, the CPU 101 may be a microprocessor. The RAM 102 temporarily stores a program used in the execution of the CPU 101, parameters arbitrarily changed in the execution, or the like. These are connected to each other by a host bus configured from a CPU bus or the like. The non-volatile memory 103 stores a program to be used by the CPU 101, operation parameters, or the like. As the non-volatile memory 103, a ROM (Read Only Memory), a flash memory, or the like can be used, for example.

The display device 104 is an example of an output device for outputting information. As the display device 104, a liquid crystal display (LCD) device, an OLED (Organic Light Emitting Diode) device, or the like can be used, for example. The capacitive touch panel 105 is an example of an input device for a user to input information, and is configured from input means for inputting information, an input control circuit for generating an input signal based on input from the user and outputting the same to the CPU 101, and the like. Similarly to the capacitive touch panel 105, the pressure-sensitive sensor 106 is also an example of the input device for a user to input information. The capacitive touch panel 105 and the pressure-sensitive sensor 106 may be configured as described above.

A user can input various data to the information processing apparatus 100 or instructs the same for a processing operation by operating the capacitive touch panel 105 and the pressure-sensitive sensor 106. With the information processing apparatus 100 according to the present embodiment, a contact operation on a contact operation surface is detected by the capacitive touch panel 105, and pressure on the contact operation surface is detected by the pressure-sensitive sensor 106.

(3) Functional Configuration of Information Processing Apparatus

Figure 3:
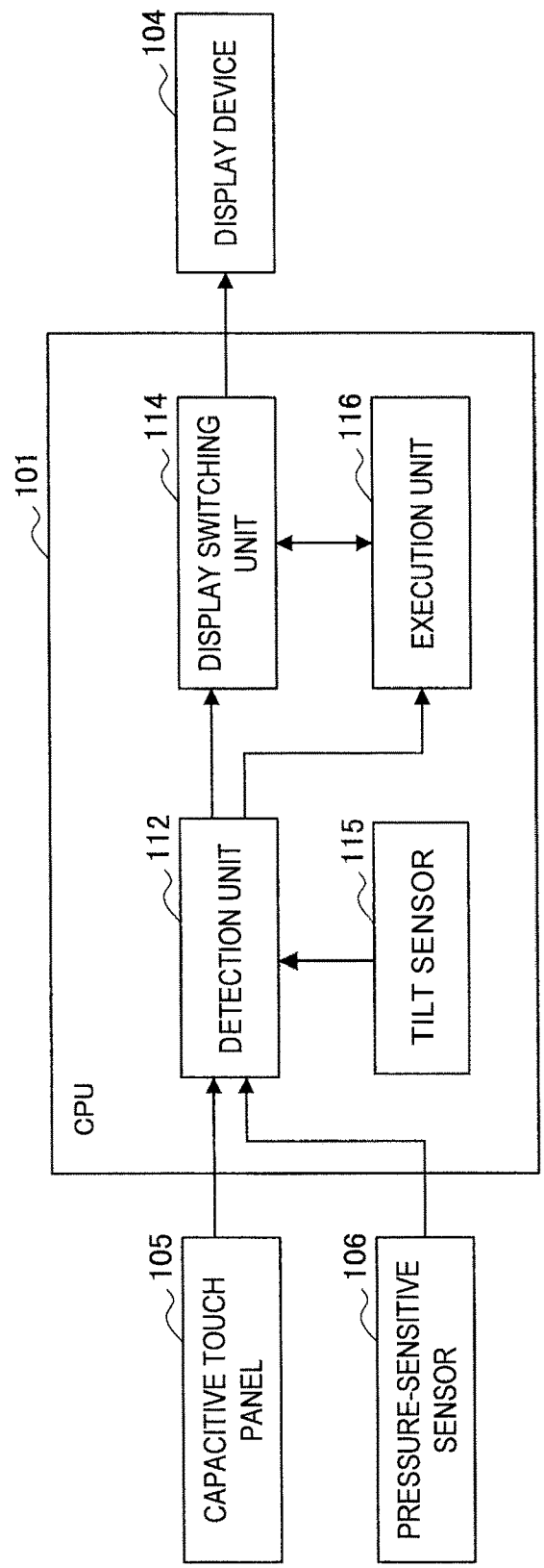
FIG. 3 is a block diagram showing a functional configuration of the information processing apparatus according to the embodiment.

In the foregoing, the hardware configuration of the information processing apparatus 100 according to the present embodiment has been described. Next, the functional configuration of the information processing apparatus 100 will be described with reference to FIG. 3. In FIG. 3, display switching control by the CPU 101 will be specifically described. Additionally, when describing the functional configuration of the information processing apparatus 100 shown in FIG. 3, the explanation will be given referring to FIGS. 4 to 11 as appropriate. As shown in FIG. 3, the CPU 11 includes a detection unit 112, a display switching unit 114, a tilt sensor 115, an execution unit 116, and the like.

The detection unit 112 has a function of detecting a contact operation of an operating object on a contact operation surface (display screen) input via the capacitive touch panel 105. As described above, when a contact object contacts the display screen, the capacitance to be detected by the capacitive touch panel 105 increases. When the value of the capacitance detected by the capacitive touch panel 105 exceeds a predetermined value, the detection unit 112 can detect that the operating object has contacted the display screen. The detection unit 112 decides whether or not the operating object has contacted the display screen, and in the case it is decided that the operating object has contacted, provides the value of the capacitance which has been detected to the display switching unit 114 and the execution unit 116 as the detection result.

Furthermore, the detection unit 112 has a function of detecting a pressure of the operating object on the contact operation surface. As described above, the pressure-sensitive sensor 106 detects an electric signal that is according to the magnitude of the pressure. The detection unit 112 decides based on the electric signal detected by the pressure-sensitive sensor 106 whether or not the operating object has pressed the display screen, and in the case it is decided that the operating object has pressed, provides the detected pressure to the display switching unit 114 and the execution unit 116 as the detection result.

Furthermore, the detection unit 112 may acquire turning of a housing of the information processing apparatus 100 detected by the tilt sensor 115. The tilt sensor 115 may be any that can detect turning of a housing, such as a gyro sensor, a mechanical or optical 4-direction sensor, or the like, for example. The gyro sensor can detect turning of the housing by measuring an angular velocity. Also, the mechanical or optical 4-direction sensor is a device capable of detecting four directions by using an infrared LED, a transistor and the like, and can detect turning or orientation of the housing.

Figure 4:
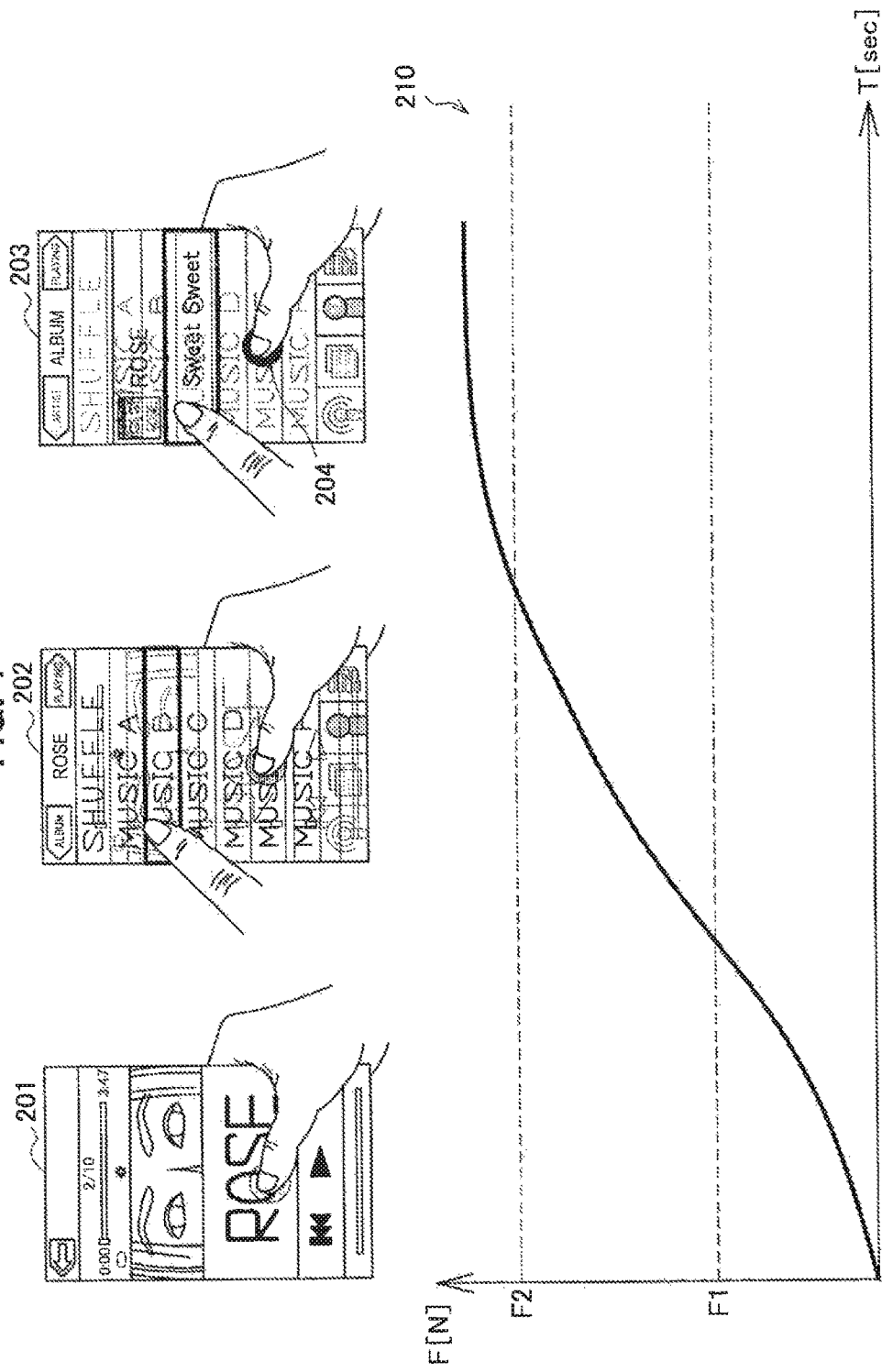
FIG. 4 is an explanatory diagram describing switching of a display screen according to the embodiment.

The display switching unit 114 has a function of switching display on the display screen according to a pressure of the operating object detected by the detection unit 112. Here, switching of the display screen by the display switching unit 114 will be described with reference to FIG. 4. FIG. 4 is an explanatory diagram describing a relationship between an example screen of the display screen to be switched by the display switching unit 114 and a pressure. In the following, an explanation will be given taking music data as an example of the data to be displayed on the display screen. The music data has a hierarchical structure, and is a three-level structure from a higher level to a lower level. The highest level is artists, and the lower level than the artists is albums. Furthermore, the lower level than the artists is music pieces.

Also, the display screen for playing back the music data has a four-level structure. The display of the highest level is an artist list, and the display of the lower level than the artist list is an album list. Also, the display of the lower level than the album list is a music list. Furthermore, the list of the lower level than the music list is a playback display of music. Normally, in the case of playing back music data having a hierarchical structure, an artist desired to be played back is first selected from the artist list, and then an album desired to be played back is selected from the album list of the selected artist. Then, when a music piece desired to be played back is selected from the music list of the selected album, the playback screen of the selected music piece is displayed.

In the case of selecting another artist or another album after the music piece selected by the above process is played back, a target has to be selected by tracing back to the higher level. For example, in the case of reselecting another artist after playing back the music piece, one returns to the display screen of the music list which is the higher level than the playback screen of the music piece, and returns to the display screen of the album list which is the higher level than the music list. Then, one further returns to the display screen of the artist list which is the higher level than the album list, and can reselect an artist. That is, the display screen has to be touched three times before returning to the display screen of the artist list from the playback screen of the music piece.

In this manner, to select a target from music data having a hierarchical structure, operations of "returning" to a hierarchical level and "selecting" a target have to be repeated several times.

However, according to the present embodiment, it is possible to smoothly move to each hierarchical level according to a pressure of an operating object and to easily select music data which is the target. Movement through hierarchical levels according to the present embodiment will be described in detail. It can be seen from a graph 210 of FIG. 4 that the pressure of an operating object is increasing with the passing of time. In the graph 210, it can be seen that the pressure of the operating object increases from 0 to F1 and F2, and further to higher than F2.

In the case the pressure of the operating object is F1 or lower, that is, from a state where no pressure of the operating object is imposed on the display screen to until the pressure of the operating object on the display screen becomes F1, an example screen 201 is displayed on the display screen. The example screen 201 is the playback screen of music data, for example. Then, an example screen 202 is displayed on the display screen from when the pressure of the operating object on the display screen becomes higher than F1 to when it becomes F2. The example screen 202 is a screen of the music list of the music data, for example. Then, when the pressure of the operating object on the display screen becomes higher than F2, an example screen 203 is displayed on the display screen. The example screen 203 is a screen of the album list of the music data, for example.

In this manner, according to the present embodiment, when the display screen is pressed down by the operating object, it becomes possible to move through the hierarchical levels according to the degree of press-down. For example, when the pressure increases, switching to the higher level is performed by the display switching unit 114, and when the pressure decreases, switching to the lower level is performed. If the display screen is pressed down by the operating object while a music piece is being played back, that is, while the display screen of the music piece is being displayed, the display switching unit 114 causes the screen to transition from the playback screen of the music piece to the display screens of the higher levels from the music list, to the album list, and then to the artist list.

Furthermore, when the pressure of the pressing operating object is relaxed after the transition to the display screen of the artist list, the display switching unit 114 causes the screen to transition from the artist list to the initial music playback screen. At the time of causing the screen to transition, the display switching unit 114 increases, according to the pressure, the transparency of the display showing the current hierarchical level, and displays the higher level or the lower level than the current hierarchical level.

Furthermore, at the time of causing the screen to transition, the display switching unit 114 may also change, according to the pressure, the size of the display showing the current hierarchical level. For example, the display showing the current hierarchical level may be made gradually smaller to display the higher level or the lower level than the current hierarchical level.

Furthermore, the display switching unit 114 may change, according to the pressure of the operating object on the contact operation surface detected by the detection unit 112, the display colour of the position corresponding to the contact part on the contact operation surface. For example, as shown in FIG. 4, in the case the display screen is pressed by the operating object, a contact part 204 of the operating object is displayed in a circular form on the display screen.

The contact part 204 changes according to the pressure of the operating object. For example, when the pressure is 3N or lower, the contact part 204 is displayed in blue, and when the pressure is higher than 3N and equal to or lower than 7N, the contact part 204 is displayed in yellow. Also, when the pressure is higher than 7N, the contact part 204 is displayed in red.

In this manner, by changing the display colour of the contact part 204 according to the pressure, a user is allowed to visually recognise what level of force of pressing the display screen will cause transition between hierarchical levels. Hence the user can, more intuitively, change the display screen to the higher level or the lower level or select a target.

Also, display of whether or not a display screen will be switched by pressing the display screen is possible. For example, in the case the operating object contacted the display screen, a message to the effect that switching of the display screen by a pressure is possible may be displayed overlapping the display screen that is displayed.

Returning to FIG. 3, the execution unit 116 has a function of performing, in the case a predetermined operation of the operating object on the contact surface is detected by the detection unit 112 while the display on the display screen is being switched by the display switching unit 114, a predetermined process according to the predetermined operation. A predetermined operation on the contact surface is, for example, another operation different from press-down by the operating object, and contact (touch) on the display screen may be cited, for example. For example, as shown in FIG. 4, a user changes the hierarchical level of the display screen by pressing the display screen with the right hand, and touches the selection target with the left hand while the hierarchical level desired to be selected is being displayed. A predetermined process to be performed by the execution unit 116 is a determination operation for a hierarchical level, target selection in the determined hierarchical level, or the like.

As described above, the execution unit 116 performs a process indicated by the user, according to a predetermined operation performed during transition of the hierarchical level of the display screen according to the pressure of the user. Also, the execution unit 116 may perform a predetermined process according to the contact operation of the operating object, in the case the pressure of the operating object being detected by the detection unit 112 exceeds a predetermined threshold within a predetermined time while the display on the display screen is being switched by the display switching unit 114.

Figure 5:
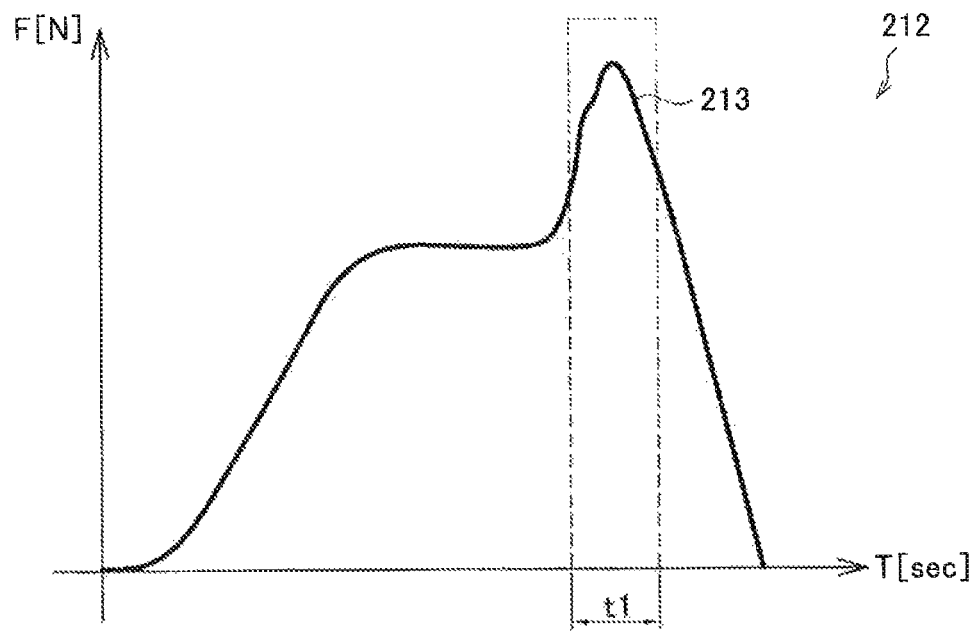
FIG. 5 is an explanatory diagram describing a relationship between pressure and time according to the embodiment.

Here, a case where the pressure of the operating object exceeds a predetermined threshold within a predetermined time will be described with reference to FIG. 5. FIG. 5 is an explanatory diagram describing a relationship between the pressure F[N] and time t[sec]. As shown in FIG. 5, the pressure increases with the passing of time, and the pressure sharply changes during time t1. That is, an operation of strongly pressing down the display screen in a short time is performed by the user within the time t1. In the case an operation by which the pressure is sharply changed is performed by the user in this manner, the execution unit 116 causes the hierarchical level displayed during the time t1 to become fixed and selects a target in the hierarchical level touched by the operating object.

Figure 6:
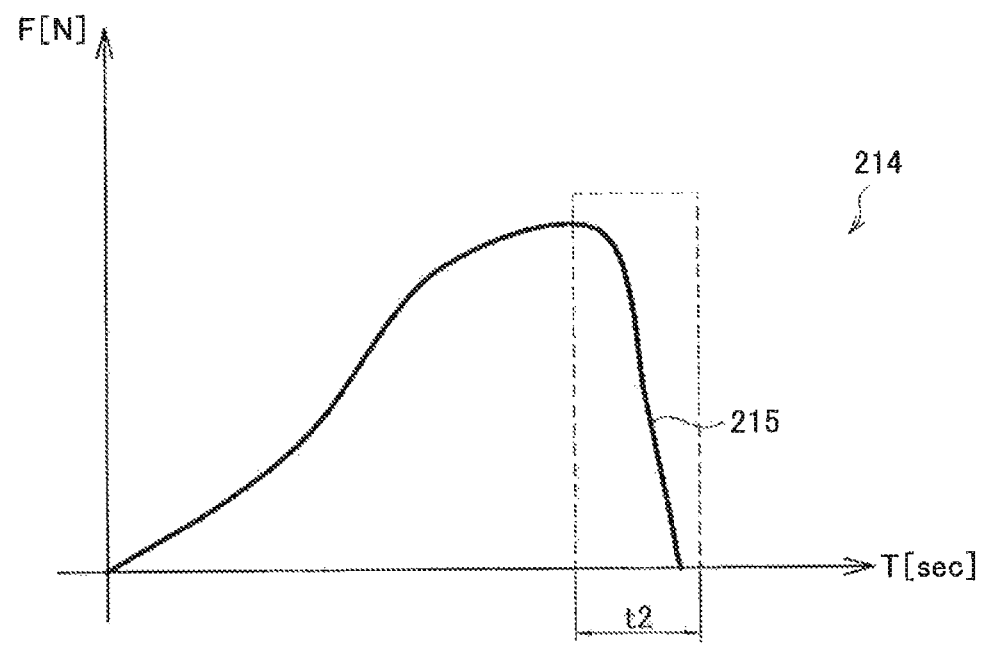
FIG. 6 is an explanatory diagram describing a relationship between pressure and time according to the embodiment.

Furthermore, a case where the pressure sharply decreases will be described with reference to FIG. 6. As shown in FIG. 6, the pressure of the operating object increases with the passing of time, and the pressure sharply during a time t2.

The execution unit 116 may perform a predetermined process in the case the pressure sharply decreases in a short time in this manner. The user gradually presses down the display screen and suddenly stops pressing down of the display screen within the time t2. That is, the pressing operating object is suddenly removed from the display screen. In this case, the execution unit 116 causes the hierarchical level displayed during the time t2 to become fixed and selects a target in the hierarchical level touched by the operating object.

Figure 7:
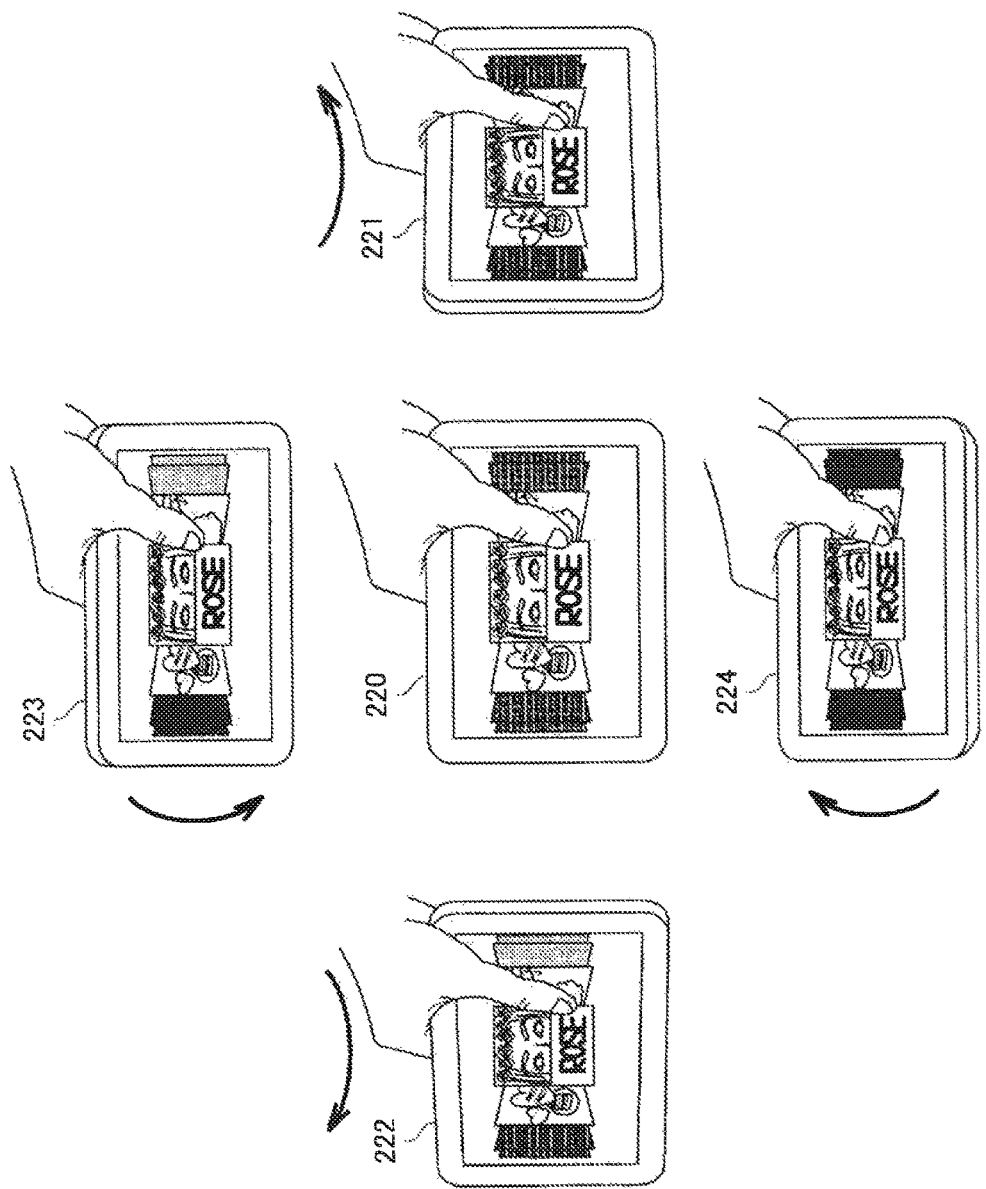
FIG. 7 is an explanatory diagram describing a process according to turning of a housing according to the embodiment.
Figure 8:
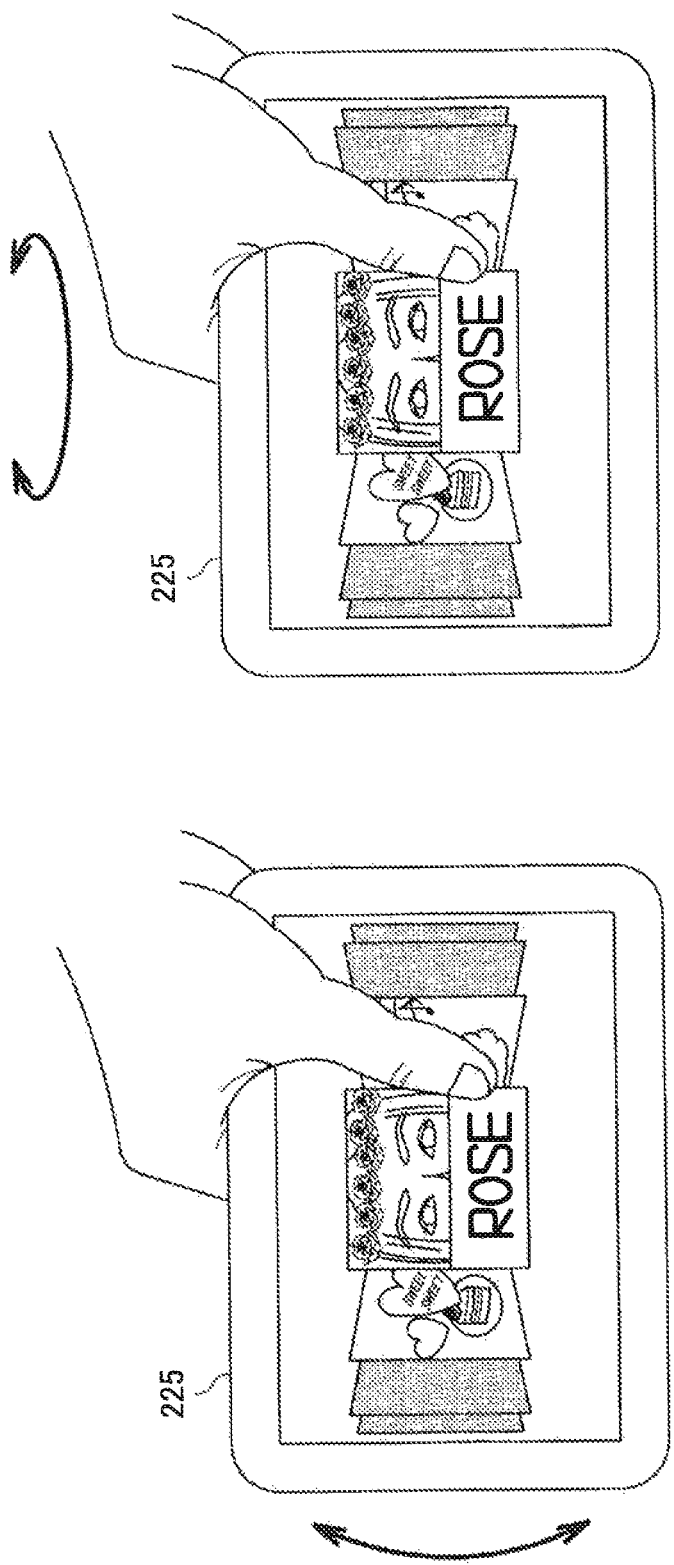
FIG. 8 is an explanatory diagram describing a process according to turning of a housing according to the embodiment.

Furthermore, the execution unit 116 may perform a predetermined process according to turning of the housing, in the case turning of the housing is detected by the detection unit 112 while the display on the display screen is being switched by the display switching unit 114. Here, a case where a predetermined process is performed by the execution unit 116 according to turning of the housing will be described with reference to FIGS. 7 and 8. FIGS. 7 and 8 are explanatory diagrams describing cases where predetermined processes are performed by the execution unit 116 according to turning of the housing.

The user is assumed to be holding the information processing apparatus 100 in the manner shown in an explanatory diagram 220 of FIG. 7. The thumb of the user, which is the operating object, is in contact with the display screen. The user causes transition to the higher level by pressing the display screen or causes transition to the lower level by gradually removing the operating object from the display screen. For example, when giving an explanation taking the music data described above as an example, the user causes transition to the screen of the album list or the artist list by pressing the display screen on which the music playback screen is displayed. Then, it is assumed that the housing is turned to the right while the display screen is being switched as shown in an explanatory diagram 221. In this case, the execution unit 116 may cause the hierarchical level that is displayed at the time of turning of the housing to become fixed, and scroll the display screen to the direction to which the housing is further turned (right direction).

Similarly, it is assumed that the housing is turned to the left, as shown in an explanatory diagram 222, while the display screen is being switched. In this case, the execution unit 116 may cause the hierarchical level that is displayed at the time of turning of the housing to become fixed, and scroll the display screen to the direction to which the housing is further turned (left direction). Furthermore, it is assumed that the housing is turned upward (downward), as shown in an explanatory diagram 223, while the display screen is being switched. In this case, the execution unit 116 may cause the hierarchical level that is displayed at the time of turning of the housing to become fixed, and scroll the display screen to the direction to which the housing is further turned (upward or downward direction).

Furthermore, also in the case the housing is shaken left or right or up or down by the user as shown in FIG. 8, the hierarchical level that is displayed at the time the housing being shaken left or right (or up or down) may become fixed. Furthermore, the execution unit 116 may change the target to be selected according to the vibration of the shaken housing.

Figure 9:
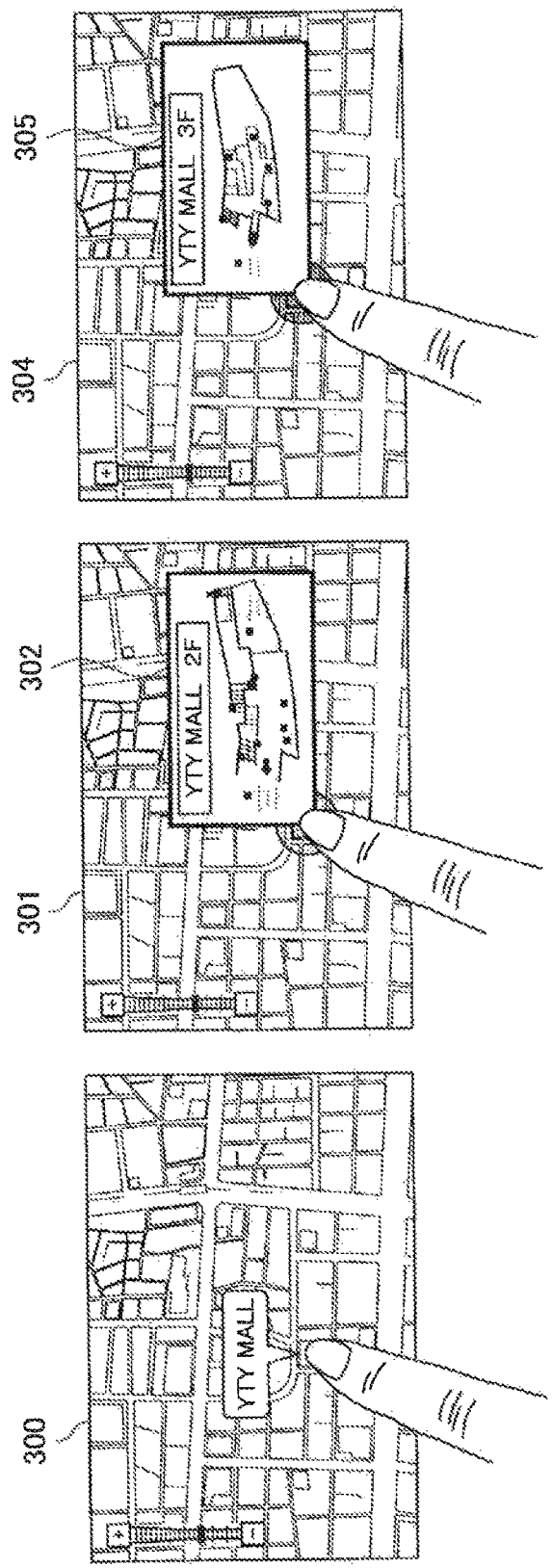
FIG. 9 is an explanatory diagram describing a display example of a hierarchical display on a map according to the embodiment.

Also, in the above, an explanation has been given taking the music data as an example, but limitation is not made to such an example, and data having a hierarchical structure can be used. For example, it may be data of a video or a still image, schedule data, or the like. Also, in the case a map is being displayed on the display screen, the contents of a hierarchical display included in the map display may be displayed according to the pressure of the operating object. Here, a display example of a hierarchical display on a map will be described with reference to FIG. 9. FIG. 9 is an explanatory diagram describing a display example of a hierarchical display on a map.

As shown in FIG. 9, a hierarchical display showing a multi-level hierarchy is included in a map 301. A hierarchical display showing a multi-level hierarchy is a building, a department store, or the like, where a plurality of floors are present at one spot. The user contacts and presses down with the operating object a spot where a hierarchical display is desired. The display switching unit 114 displays the contents of a floor at the specified spot, according to the pressure of the operating object. For example, in the case the spot contacted and specified by the operating object is an 8-floor building, the contents of a floor, which is higher as the pressure increases, are displayed.

Furthermore, the execution unit 116 may also cause the hierarchical display to become fixed by contact of the operating object other than press-down while the content display of a floor at the specified spot is being switched, as described above, and display further detailed information on the part contacted by the operating object. For example, in the case a plurality of stores are placed in each floor of the specified building, detailed information such as name, opening hours, closing days or the like of a store specified by contact of the operating object other than press-down may be displayed. Also at the time of switching the content display of a floor, the colour display of a contact part 303 of the operating object may be changed according to the pressure of the operating object, as shown in FIG. 9.

Figure 10:
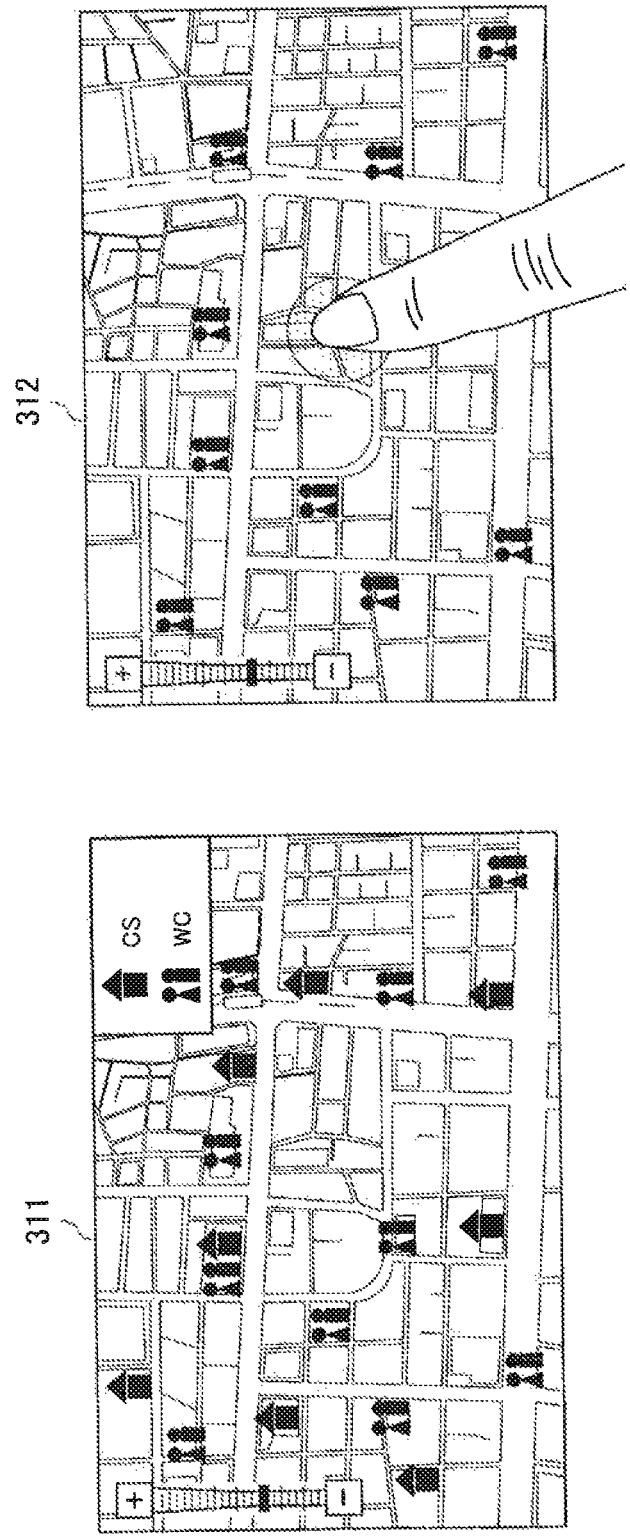
FIG. 10 describes a case where a plurality of spots are displayed on a map according to the embodiment.

Also, in the case a plurality of spots are overlapped with each other on a map, the display switching unit 114 may classify the plurality of spots into groups and switch the display screen so as to display the plurality of spots according to each group. Here, a case where a plurality of spots are displayed on a map will be described with reference to FIG. 10. FIG. 10 is an explanatory diagram describing an example of display switching for a case where a plurality of spots are displayed on a map. For example, as shown in FIG. 10, it is assumed that "convenience store" and "rest room" are displayed on a map, as in a display example 311, as a result of the user performing a search using a search function of the information processing apparatus 100.

At this time, there was a problem that, with the display example 311, in the case a display of "convenience store" and a display of "rest room" were overlapped or too close to each other, a target display was not successfully selected by contact of the operating object. In this case, the user had to display the map in an enlarged manner, or had to change the display scope. However, according to the present embodiment, the search results can be classified into groups, and the search results can be displayed according to each group. For example, in the case displays of "rest room" and "convenience store" are on the same map, only the "rest room" may be displayed or only the "convenience store" may be displayed according to the pressure of the contact object.

For example, with a display example 312 of FIG. 10, in the case the pressure of the operating object is higher than 2N and equal to or lower than 5N, only the "rest room" is displayed. Also, with a display example 314 of FIG. 11, in the case the pressure of the operating object is higher than 5N, only the "convenience store" is displayed. The user can check only the locations of rest rooms on the map or check only the locations of convenience stores by simply changing the pressure of the operating object. As shown in FIGS. 10 and 11, also at the time of switching the content display according to each group as described above, the colour display of the contact part of the operating object may be changed according to the pressure of the operating object.

(4) Details of Operation of Information Processing Apparatus

Figure 12:
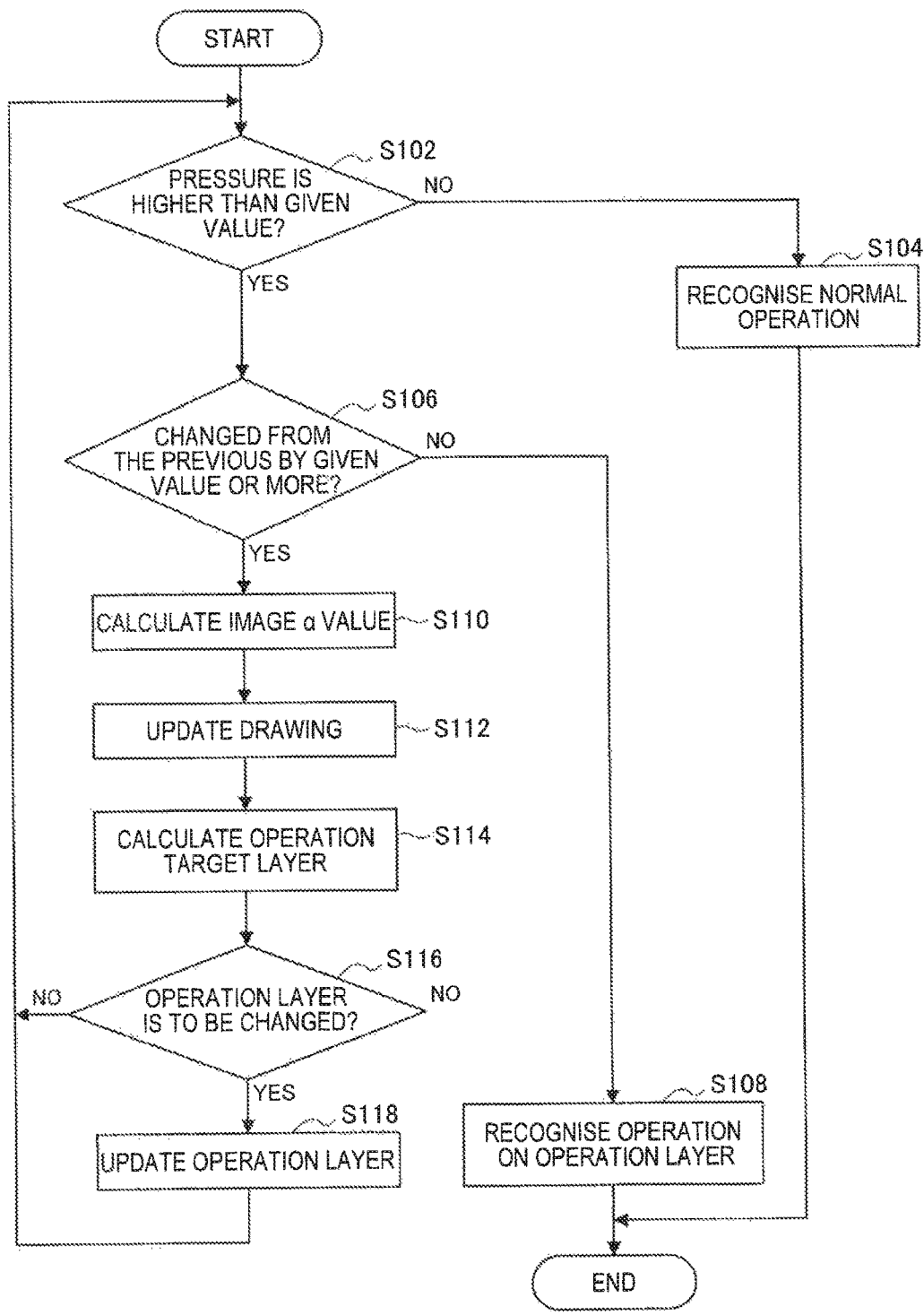
FIG. 12 is a flow chart showing details of an operation of the information processing apparatus according to the embodiment.

In the foregoing, the functional configuration of the information processing apparatus 100 has been described. Next, details of an operation of the information processing apparatus 100 will be described with reference to FIG. 12. FIG. 12 is a flow chart showing details of an operation of the information processing apparatus 100. As shown in FIG. 12, first, the detection unit 112 detects the pressure of an operating object, and decides whether or not the pressure of the operating object is higher than a given value (S102). In the case the pressure of the operating object is decided in step S102 to be not higher than the given value, it is a normal operation and is recognised as the normal operation (S104).

In the case the pressure of the operating object is decided in step S102 by the detection unit 112 to be a value higher than the given value, it is decided whether or not the detected pressure has changed by a given value or more compared to the previously detected pressure (S106). In step S106, in the case there is a change from the previously detected pressure by the given value or more, it is indicated that the display screen is further pressed down by the operating object. On the other hand, in step S106, in the case there is no change from the previously detected pressure by the given value or more, it is indicated that no further press down is performed by the operating object. By preventing the display switching process of steps of S110 and later to be performed in the case there is a change by the given value or more in step S106, display switching not intended by the user can be prevented.

In the case it is decided in step S106 that there is a change from the previously detected pressure by the given value or more, the display switching unit 114 calculates an α value of the image that is displayed on the display screen (S110). Not only the α value of the image but also the transparency or scale of the image may be calculated in step S110. Then, the display switching unit 114 updates the drawing displayed on the display screen according to the pressure of the operating object detected in step S106 (S112).

The drawing to be obtained by the update in step S112 is, as described above, the drawing of the higher level or the drawing of the lower level than the currently displayed hierarchical level, for example. Then, a layer to be an operation target is calculated (S114). A layer to be an operation target in step S114 means, in the case of displaying data having a hierarchical structure, for example, a hierarchical level to be the operation target. Also, in the case of displaying data classified into a plurality of groups, it means display of a group to be the operation target.

Next, the execution unit 116 decides whether or not to change the layer to be the operation target, based on the value of the operation target layer calculated in step S114 (S116). As described above, the execution unit 116 performs a predetermined process in the case a predetermined operation is performed while the display screen is being switched by the display switching unit 114. In the case a predetermined operation is performed before the complete switching of the display switching unit 114 of the display screen from the lower level to the higher level, whether a process is to be performed in the lower level or whether the process is to be performed in the higher level has to be determined. For example, in the case a predetermined operation is performed before the display screen is completely switched from the lower level to the higher level, the execution unit 116 may perform processing of the lower level.

Next, in the case the operation layer is decided in step S116 to be changed, the operation layer is updated and a specified process is performed (S118). In the case the operation layer is decided in step S116 not to be changed, the process from step S102 is performed again.

In the case it is decided in step S106 that there is no change from the previously detected pressure by the given value or more, the execution unit 116 recognises an operation for the operation layer that is displayed, and performs a designated process (S108). In the foregoing, the details of an operation of the information processing apparatus 100 have been described.

According to the above-described embodiment, a contact operation and the pressure of the operating object operating the display screen are detected, and the display on the display screen is switched according to the detected pressure of the operating object. Then, in the case an operation such as a touch of the operating object on the contact operation surface, a sharp change in the pressure, turning of the housing, or the like is detected while the display screen is being switched, a predetermined process is performed according to the operation. This enables to easily switch the display on the display screen with a small number of operation steps and to perform a designated process.

Furthermore, since it is possible to switch the display screen or to perform a process by a combination of the pressure and the contact operation of the operating object, the operability can be extended without interfering with an existing operation. Furthermore, by returning a feedback such as changing of the display colour in accordance with the pressure, an intuitive operation can be realized.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps of the processing of the information processing apparatus 100 of the present specification do not necessarily have to be processed chronologically according to the order described as the flow chart. That is, the steps of the processing of the information processing apparatus 100 may be different processes or they may be processed in parallel.

Furthermore, a computer program for causing hardware, such as a CPU, a ROM, a RAM, or the like, installed in the information processing apparatus 100 or the like to realize the same function as each component of the above-described information processing apparatus 100 can also be created. Furthermore, a storage medium storing the computer program is also provided.

REFERENCE SIGNS LIST

100 Information processing apparatus
104 Display device
105 Capacitive touch panel
106 Pressure-sensitive sensor
112 Detection unit
114 Display switching unit
116 Execution unit

The invention claimed is:

1. An information processing apparatus comprising:
one or more circuitry configured to
  detect a contact operation and a pressure of the contact operation,
  initiate display of a first hierarchical image comprising a plurality of selectable objects,
  select one object of the plurality of selectable objects based on the detected contact operation,
  initiate display of a shift image as a transition between the first hierarchical image and a second hierarchical image having a hierarchical relationship with the first hierarchical image based on the pressure of the contact operation, and
  switch the shift image to the second hierarchical image, which comprises at least one object having a hierarchical relationship with the selected object, when the pressure of the contact operation exceeds a predetermined threshold,
  wherein the shift image includes the first hierarchical image displayed with an effect applied thereto, and
  wherein the effect is changed based on a force of the pressure.

2. The information processing apparatus according to claim 1, wherein the shift image includes a display of the first hierarchical image and the second hierarchical image at the same time.

3. The information processing apparatus according to claim 1, wherein the shift image includes the first hierarchical image having a transparency level of the plurality of selectable objects changed according to the pressure.

4. The information processing apparatus according to claim 3, wherein, while the transparency level of the first hierarchical image changes according to the pressure, the one or more circuitry is further configured to
display the second hierarchical image.

5. The information processing apparatus according to claim 1, wherein the shift image includes the first hierarchical image having its color changed according to the pressure.

6. The information processing apparatus according to claim 1, wherein the one or more circuitry is further configured to
initiate display of a map including hierarchical display indicating one more multi-level hierarchy to be displayed, and causes, according to the detected contact operation, the map including contents of the hierarchical display to be displayed.

7. The information processing apparatus according to claim 1, further comprising a pressure sensitive sensor.

8. The information processing apparatus according to claim 1, further comprising a capacitive touch panel.

9. The information processing apparatus according to claim 1, wherein the information processing apparatus is any of: a media player, a portable digital assistant, or a cellular phone.

10. The information processing apparatus according to claim 1, further comprising a tilt sensor.

11. The information processing apparatus according to claim 10, wherein the tilt sensor is a gyro sensor.

12. The information processing apparatus according to claim 10, wherein the tilt sensor is an optical four-direction sensor.

13. The information processing apparatus according to claim 1, wherein the second hierarchical image includes a music title.

14. The information processing apparatus according to claim 1, wherein the effect is a transparency level of the first hierarchical image.

15. The information processing apparatus according to claim 1, wherein the shift image includes the first hierarchical image displayed with the effect applied to the plurality of selectable objects.

16. An information processing method comprising:
detecting a contact operation;
detecting a pressure of the contact operation;
displaying a first hierarchical image comprising a plurality of selectable objects;
selecting one object based on the detected contact operation;
displaying a shift image as a transition between the first hierarchical image and a second hierarchical image having a hierarchical relationship with the first hierarchical image based on the pressure of the contact operation; and
switching the shift image to the second hierarchical image, which comprises at least one object having a hierarchical relationship with the selected object, when the pressure of the contact operation exceeds a predetermined threshold,
wherein the shift image includes the first hierarchical image displayed with an effect applied thereto, and
wherein the effect is changed based on a force of the pressure.

17. A non-transitory computer-readable medium having embodied thereon a program, which when executed by a computer causes the computer to execute a method, the method comprising:
detecting a contact operation;
detecting a pressure of the contact operation;
displaying a first hierarchical image comprising a plurality of selectable objects;
selecting one object of the plurality of selectable objects based on the detected contact operation;
displaying a shift image as a transition between the first hierarchical image and a second hierarchical image having a hierarchical relationship with the first hierarchical image based on the pressure of the contact operation; and
switching the shift image to the second hierarchical image, which comprises at least one object having a hierarchical relationship with the selected object, when the pressure of the contact operation exceeds a predetermined threshold,
wherein the shift image includes the first hierarchical image displayed with an effect applied thereto, and
wherein the effect is changed based on a force of the pressure.

* * * * *